(12) United States Patent
Barton

(10) Patent No.: US 9,174,843 B2
(45) Date of Patent: Nov. 3, 2015

(54) VALVE HAVING CONCENTRIC FLUID PATHS

(75) Inventor: Russell H. Barton, New Westminster (CA)

(73) Assignee: Intelligent Energy Inc., San Jose, CA (US)

(*) Notice: Subject to any disclaimer, the term of this patent is extended or adjusted under 35 U.S.C. 154(b) by 586 days.

(21) Appl. No.: 13/549,536

(22) Filed: Jul. 16, 2012

(65) Prior Publication Data

US 2014/0014205 A1 Jan. 16, 2014

(51) Int. Cl.
*H01M 8/04* (2006.01)
*C01B 3/08* (2006.01)
*F16L 1/00* (2006.01)
*F17C 13/04* (2006.01)
*C01B 3/06* (2006.01)

(52) U.S. Cl.
CPC ... *C01B 3/08* (2013.01); *C01B 3/06* (2013.01); *C01B 3/065* (2013.01); *F16L 1/00* (2013.01); *F17C 13/04* (2013.01); *Y10T 137/87676* (2015.04)

(58) Field of Classification Search
USPC ......... 429/443, 444, 446, 455, 462, 105, 112; 422/105, 112
IPC .............................. H01M 8/04,8/0482, 8/04201
See application file for complete search history.

(56) References Cited

U.S. PATENT DOCUMENTS

| | | | |
|---|---|---|---|
| 7,198,474 B2 | 4/2007 | Arthur et al. | |
| 7,776,487 B2 * | 8/2010 | Tanaka et al. | 429/506 |
| 2012/0141918 A1 | 6/2012 | Kawata et al. | |

OTHER PUBLICATIONS

U.S. Appl. No. 13/460,866, entitled "Gas Generator with Combined Gas Flow Valve and Pressure Relief Vent", filed May 1, 2012.
U.S. Appl. No. 13/444,878, entitled "Hydrogen Generator with Improved Volume Efficiency", filed Apr. 12, 2012.

* cited by examiner

*Primary Examiner* — Patrick Ryan
*Assistant Examiner* — Julian Anthony
(74) *Attorney, Agent, or Firm* — Baker & Hostetler LLP

(57) ABSTRACT

A valve assembly is provided with concentric fluid paths and may be used on a hydrogen generator to transport liquid reactant to the hydrogen generator and hydrogen gas. The valve assembly includes a housing defining first and second fluid paths, a first valve member disposed in the first fluid path, and a second valve member disposed in the second fluid path. The assembly includes a connector including a first elongated member configured to engage the first valve member to open the first valve member to allow a first fluid to flow through the first fluid path, and a second fluid port including a second elongated member configured to allow fluid to flow through the second fluid path. The valve assembly is concentric in that the second fluid path surrounds at least a portion of the first fluid path.

19 Claims, 5 Drawing Sheets

VALVE HAVING CONCENTRIC FLUID PATHS

FIELD OF THE INVENTION

The present invention generally relates to valves, and more particularly relates to a valve arrangement having a plurality of fluid flow paths for controlling the flow of a first fluid such as water, and a second fluid such as hydrogen.

BACKGROUND

Interest in fuel cell batteries as power sources for portable electronic devices has grown. A fuel cell is an electrochemical cell that uses materials from outside the cell as the active materials for the positive and negative electrodes. Because a fuel cell does not have to contain all of the active materials used to generate electricity, the fuel cell can be made with a small volume relative to the amount of electrical energy produced compared to other types of batteries.

Fuel cells can be categorized according to the types of materials used in the positive electrode (cathode) and negative electrode (anode) reactions. One category of fuel cell is a hydrogen fuel cell using hydrogen as the negative electrode active material and oxygen as the positive electrode active material. When such a fuel cell is discharged, hydrogen is oxidized at the negative electrode to produce hydrogen ions and electrons. The hydrogen ions pass through an electrically nonconductive, ion permeable separator and the electrons pass through an external circuit to the positive electrode, where oxygen is reduced.

In some types of hydrogen fuel cells, hydrogen is formed from a fuel supplied to the positive electrode side of the fuel cell, and hydrogen is produced from the supplied fuel. In other types of hydrogen fuel cells, hydrogen gas is supplied to the fuel cell from a source outside the fuel cell. A fuel cell system can include a fuel cell battery, including one or more fuel cells, and a hydrogen source, such as a hydrogen tank or a hydrogen generator. In some fuel cell systems, the hydrogen source can be replaced after the hydrogen is depleted. Replaceable hydrogen sources can be rechargeable or disposable.

A hydrogen generator uses one or more reactants containing hydrogen that can react to produce hydrogen gas. The reaction can be initiated in various ways, such as hydrolysis and thermolysis. For example, two reactants can produce hydrogen and byproducts when mixed together. A catalyst can be used to catalyze the reaction. When the reactants react, reaction products including hydrogen gas and byproducts are produced. The hydrogen gas is separated from byproducts and unreacted reactants, and the gas exits the hydrogen generator and is provided to the fuel cell battery.

For a hydrolysis reaction, the hydrogen generator typically has a first fluid path for receiving a liquid solution and a second fluid path for outputting the hydrogen generated. As such, two fluid flow ports are generally required to be connected to the hydrogen generator cartridge and both ports must be disconnected and reconnected upon changing of the cartridge. It would be desirable to provide for fluid flow connection for transporting the reactant liquid and the hydrogen output which has fewer components and is easy to connect and disconnect.

SUMMARY

Advantages are provided by a concentric valve assembly and a hydrogen generator employing the concentric valve assembly according to the present invention.

According to one aspect of the present invention, a concentric valve assembly is provided. The valve assembly includes a housing defining a first fluid path and a second fluid path. The valve assembly also includes a first valve member disposed in the first fluid path, and a second valve member disposed in the second fluid path. The valve assembly further includes a connector including a first elongated member having a first fluid passage and configured to engage the first valve member to open the first valve member to allow a first fluid to flow through the first fluid path. The connector further includes a second fluid port including a second elongated member having a second fluid passage and configured to allow fluid to flow through the second fluid path. The second fluid path surrounds at least a portion of the first fluid path.

Embodiments of the first aspect of the invention can include one or more of the following features:
  the valve assembly includes a first spring biasing the first valve member toward the closed position and a second spring biasing the second valve member toward the closed position, wherein the first elongated member forces the first valve member to the open position and the second elongated member forces the second valve member to the open position when the connector is assembled to the housing;
  the first elongated member includes a needle having a first width and the second elongated member comprises an enlarged base member having a second width, wherein the second width is larger than the first width;
  the valve assembly includes a first seal disposed between the first and second fluid paths;
  the first fluid path is configured to transport a liquid and the second fluid path is configured to transport a gas;
  the liquid includes water and the gas includes hydrogen;
  the valve is employed on a hydrogen generator to transport a liquid solution of reactant in the first fluid path and to transport hydrogen gas output in the second fluid path;
  the housing is assembled to an opening in a container of the hydrogen generator, wherein the connector is removably connected to the housing; and
  the second fluid path substantially surrounds the first fluid path within a portion of the valve assembly.

Another aspect of the present invention is a hydrogen generator. The hydrogen generator includes a container, a reaction area within the container, a first reactant provided in the reaction area, a liquid solution comprising a second reactant and a concentric valve assembly. The concentric valve assembly includes a housing defining a first fluid path and a second fluid path. The valve assembly also includes a first valve member disposed in the first fluid path, and a second valve member disposed in the second fluid path. The valve assembly further includes a connector including a first elongated member having a first fluid passage and configured to engage the first valve member to open the first valve member to allow a first fluid to flow through the first fluid path. The connector further includes a second elongated member having a second fluid passage and configured to allow fluid to flow through the second fluid path. The second fluid path surrounds at least a portion of the first fluid path.

Embodiments of the second aspect of the invention can include one or more of the following features:
  the valve assembly further includes a first spring biasing the first valve member toward the closed position and a second spring biasing the second valve member toward the closed position, wherein the first elongated member forces the first valve member to the open position and the second elongated member forces the second valve member to the open position, when the connector is assembled to the housing;

the first elongated member includes a needle having a first width and the second elongated member includes an enlarged base member having a second width, wherein the second width is larger than the first width;

the valve assembly has a first seal disposed between the first and second fluid paths.

the first fluid path is configured to transport a liquid and the second fluid path is configured to transport a gas;

the liquid includes water and the gas includes hydrogen;

the second fluid path substantially surrounds the first fluid path within a portion of the valve assembly;

the housing is assembled to an opening in a housing of the hydrogen generator, wherein the connector is removably connected to the housing;

the second reactant includes a solution of water; and the hydrogen generator includes a pump for pumping the water from a storage area through the concentric valve assembly into the reaction area.

These and other features, advantages and objects of the present invention will be further understood and appreciated by those skilled in the art by reference to the following specification, claims and appended drawings.

Unless otherwise specified herein, all disclosed characteristics and ranges are as determined at room temperature (20-25° C.).

DETAILED DESCRIPTION

Figure 1:
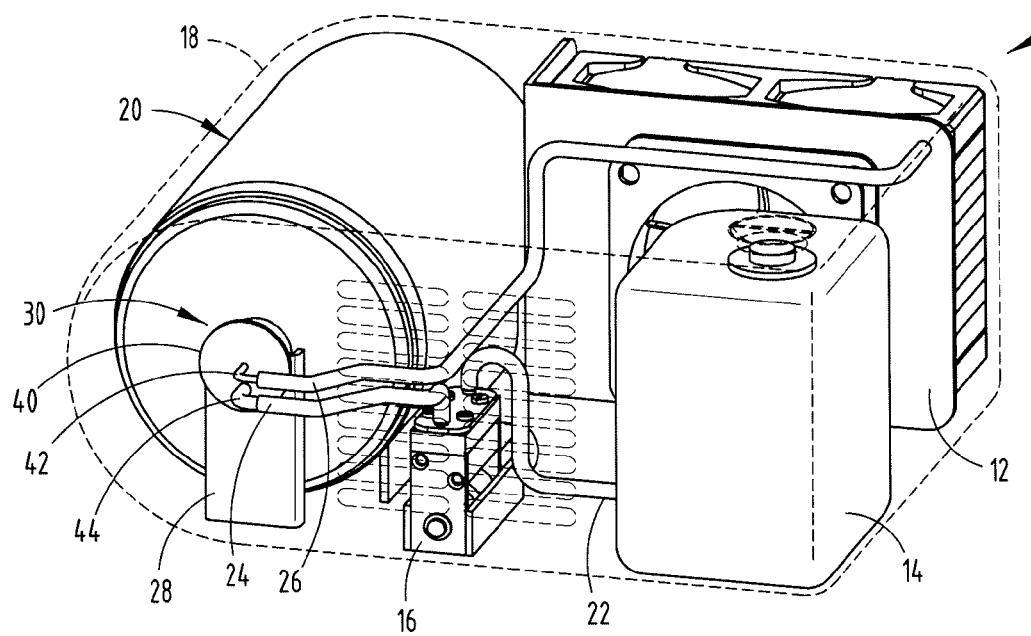
FIG. 1 is a schematic diagram of a fuel cell system including a hydrogen generator having a concentric valve assembly for receiving liquid reactant and outputting hydrogen gas.

The present invention includes a concentric valve assembly that has a first valve arranged concentrically within a second valve. The valve assembly can be incorporated into a hydrogen generator to control the transport (e.g., entry) of liquid reactant into the hydrogen generator and the transport (e.g., exit) of hydrogen gas out of the hydrogen generator. The hydrogen generator can be incorporated into a fuel cell system including a fuel cell battery, according to one embodiment shown and described herein.

The concentric valve assembly is concentric such that one of the fluid paths substantially surrounds the other of the fluid paths within a portion of the valve assembly. In one embodiment, the second fluid path substantially surrounds the first fluid path within the valve assembly. In one specific embodiment, the first fluid path contains hydrogen gas exiting the hydrogen generator and the second fluid path contains liquid reactant such as water and acid entering the hydrogen generator. As such, the water flowing through the second path surrounds the gas in the first fluid path. This concentric arrangement of a valve within a valve may minimize any leakage of gas from the valve assembly due to fewer components and the presence of a surrounding water flow path.

The housing may include a valve body disposed within an opening serving as a fitting of a container. The container may be a container for a hydrogen generator according to one embodiment. The first valve member is biased via a first spring to control access to the first fluid path and the second valve member is biased via a second spring to control fluid flow in the second fluid path. The first and second valve members may include polymeric or rubber material that allow for the formation of a fluid tight seal when the valve members are in the closed position. One or more elastomeric seals are included to form a sealed closure within each of the associated first and second fluid paths and to prevent fluid leakage outside and to the other fluid path.

The connector may be a unitary connector that is insertable within the valve body so as to actuate the first and second valve members to the open valve positions. The connector includes the first elongated member in the shape of a needle for biasing the first valve member to the open position, and a second elongated member having an enlarged base for contacting and biasing the second valve member to the open position when the connector is inserted fully within the valve body. The first elongated member has a flow passage and one or more holes located near an end that contacts and forces the first valve member to the open position to allow fluid to flow through the first fluid path. The second elongated member simultaneously has a flow passage and one or more openings to allow fluid to flow through the second path. The second elongated member is shown provided at the base of the first elongated member and having a width or diameter that is greater than a width or diameter of the first elongated member. The first elongated member in the shape of a needle extends through an opening in the second valve member and contacts and forces the first valve member to the open position. The enlarged width second elongated member contacts the second valve member and forces the second valve member to the open position when the connector is inserted within the valve body.

The connector may be made of a metal, such as stainless steel. All elastomeric seals may be provided within the valve body which may be located within the container of the hydrogen generator. As such, worn or damaged seal elements may be replaced when the container or the reactants within the container are replaced or replenished. Thus, the connector may be readily reusable without concern of prolonged seal damage to the connector.

The concentric valve assembly is concentric such that one of the fluid paths substantially surrounds the other of the fluid paths within a portion of the valve assembly. In one embodiment, the second fluid path substantially surrounds the first fluid path within the valve assembly. In one specific embodiment, the first fluid path contains hydrogen gas exiting the hydrogen generator and the second fluid path contains liquid reactant such as water and acid entering the hydrogen path. As such, the water flowing through the second path surrounds the gas in the first fluid path. This concentric arrangement of a valve within a valve may minimize any leakage of gas from the valve assembly due to fewer components and the presence of a surrounding water flow path.

The hydrogen gas generator is typically removable, replaceable or refillable unit that can supply hydrogen to a fuel cell, rather than supplying a liquid or other fluid that is reformed by or within the fuel cell to produce hydrogen gas or protons.

The fuel cell with which the hydrogen generator can be used can be a battery containing a single fuel cell, or it can be a battery containing a plurality of fuel cells (sometimes referred to as a fuel cell stack). The fuel cell can be any type of fuel cell that uses hydrogen as a fuel. Examples include proton exchange membrane fuel cells, alkaline fuel cells and solid oxide fuel cells.

In one embodiment, a hydrogen generator includes a container with one or more reactant storage areas, a reaction area, and an effluent storage area within the container. One or more reactant-containing fluids, each containing one or more reactants, are transferred from the reactant storage area or areas to the reaction area, where the reactant or reactants react to produce hydrogen gas and byproducts. One or more reactants can also be initially contained within the reaction area. The reaction can be catalyzed by a catalyst, which can be initially in the reaction area or contained in a fluid transferred to the reaction area. The byproducts can include gaseous, liquid and solid reaction products. The production of hydrogen gas forces effluent from the reaction area, through an effluent passage, to the effluent storage area. The effluent can include reaction byproducts as well as unreacted reactants and additives.

The reactant-containing fluid can be a liquid or other easily transported fluid. The reactant can be the fluid (e.g., water), or the reactant can be mixed, suspended, dissolved or otherwise contained in a liquid. After the fluid is transported from the reactant storage area to the reaction area, it reacts to produce hydrogen gas. In one embodiment, the reactant or reactants react upon contact with a catalyst in the reaction area. In another embodiment, two fluids, one or both including a reactant, are transported to the reaction area. The fluids may come in contact with each other in an intermediate mixing area or within the reaction area, where they react to produce hydrogen gas; the reaction may be catalyzed by a catalyst, which can be initially contained in the reaction area or in a fluid transported to the reaction area. In yet another embodiment, one reactant is contained in the reaction area, preferably in a solid form, and another reactant is transported from the reactant storage area to the reaction area, where the reactants react to produce hydrogen gas; the reaction may be catalyzed by a catalyst in the reaction area.

Hydrogen gas is separated from the liquid and solid effluent and is released through the hydrogen outlet to an apparatus such as a fuel cell as needed. A filter and a hydrogen permeable, liquid impermeable component may be used to separate the hydrogen. The filter removes solids and may remove liquids as well, and the hydrogen permeable, liquid impermeable component removes liquids and any remaining solids, allowing only gas to pass through the hydrogen outlet. Optionally, other components may be included within or downstream from the hydrogen generator to remove other gases and impurities from the hydrogen flow.

The filter can be a single component filter or can be a multi-component filter. It can have a uniform composition and porosity before compression, or the composition and porosity can vary. In one embodiment the filter before compression is more porous in an upstream portion (the portion that will be closer to the effluent passage) and less porous in a downstream portion (the portion that will be closer to the hydrogen outlet). In this way the filter can remove larger particles in the upstream portion while allowing smaller particles to pass to the downstream portion, to help prevent clogging of the filter. Filter components, a hydrogen permeable, liquid impermeable material or both can be coated or partially filled with one or more other materials such as a catalyst to facilitate reaction of unreacted reactants contained in the effluent, an ion-exchange resin to capture detrimental impurities in the effluent, a defoamer to break up gas bubbles in the effluent, and a surfactant to improve the flowability of the effluent.

A fluid including a reactant can be transported from the reactant storage area by any suitable means. For example, the fluids can be pumped or expelled by applying a force on the liquids, or a combination thereof. If the fluids are pumped, the pump can be within or outside the hydrogen generator. The pump can be powered by the fuel cell, a battery within the hydrogen generator, or an external power source.

The flow path of the fluid reactant composition to and within the reactant area can include various components such as tubes, wicks connections, valves, etc. Within the reaction area the fluid reactant composition can be dispersed by a dispersing member to improve the distribution of fresh reactant. The dispersing member can include one or more structures extending into or within the reaction area. The structures can be tubular or can have other shapes. At least a portion of the dispersing member can be flexible so it can move as the reactant composition and/or the reaction area change shape during operation of the hydrogen generator. In one embodiment the dispersing member can include a tube with holes or slits therein through which the fluid reactant composition can exit. In another embodiment the dispersing member can include a porous material through which the fluid reactant composition can permeate. In another embodiment the dispersing member can include a material through which the fluid reactant composition can wick. In yet another embodiment a sleeve of wicking material is provide around another component of the dispersing member. This can keep solid reaction byproducts from forming on the other component and clogging the holes, slits, pores, etc., and preventing the flow of fluid reaction composition. The generation of hydrogen gas can be controlled so hydrogen is produced as needed. Control can be based on one or more criteria, such as: pressure (e.g., internal pressure or a differential between an internal and an external pressure); temperature (e.g., hydrogen generator, fuel cell or device temperature); a fuel cell electrical condition (e.g., voltage, current or power); or a device criterion (e.g., internal battery condition, power input, or operating mode.

The hydrogen generator system can use a variety of reactants that can react to produce hydrogen gas. Examples include chemical hydrides, alkali metal silicides, metal/silica gels, water, alcohols, dilute acids and organic fuels (e.g., N-ethylcarbazole and perhydrofluorene). At least one reactant is included in the fluid stored in the reactant storage area. The fluid can be a reactant or can contain a reactant (e.g., dissolved, dispersed or suspended therein).

As used herein, the term "chemical hydride" is broadly intended to be any hydride capable of reacting with a liquid to produce hydrogen. Examples of chemical hydrides that are suitable for use in the hydrogen generating apparatus described herein include, but are not limited to, hydrides of elements of Groups 1-4 (International Union of Pure and Applied Chemistry (IUPAC) designation) of the Periodic Table and mixtures thereof, such as alkaline or alkali metal hydrides, or mixtures thereof. Specific examples of chemical hydrides include lithium hydride, lithium aluminum hydride, lithium borohydride, sodium hydride, sodium borohydride, potassium hydride, potassium borohydride, magnesium hydride, calcium hydride, and salts and/or derivatives thereof. In an embodiment, a chemical hydride such as sodium borohydride can react with water to produce hydrogen gas and a byproduct such as a borate. This can be in the presence of a catalyst, heat, a dilute acid or a combination thereof.

Chemical hydrides can react with water to produce hydrogen gas and oxides, hydroxides and/or hydrates as byproducts. The hydrolysis reaction may require a catalyst or some other means of initiation, such as a pH adjustment or heating. Chemical hydrides that are soluble in water can be included in the liquid reactant composition, particularly at alkaline pH to make the liquid sufficiently stable. The reaction can be initiated by contacting the chemical hydride solution with a catalyst, lowering the pH (e.g., with an acid), and/or heating. Chemical hydrides can be stored as a solid, and water can be added. A catalyst or acid can be included in the solid or liquid composition.

An alkali metal silicide is the product of mixing an alkali metal with silicon in an inert atmosphere and heating the resulting mixture to a temperature of below about 475° C., wherein the alkali metal silicide composition does not react with dry $O_2$. Such alkali metal silicides are described in US Patent Publication 2006/0002839. While any alkali metal, including sodium, potassium, cesium and rubidium may be used, it is preferred that the alkali metal used in the alkali metal silicide composition be either sodium or potassium. Metal silicides including a Group 2 metal (beryllium, magnesium, calcium, strontium, barium and radium) may also be suitable. In an embodiment, sodium silicide can react with water to produce hydrogen gas and sodium silicate, which is soluble in water.

A metal/silica gel includes a Group 1 metal/silica gel composition. The composition has one or more Group 1 metals or alloys absorbed into the silica gel pores. The Group 1 metals include sodium, potassium, rubidium, cesium and alloys of two or more Group 1 metals. The Group 1 metal/silica gel composition does not react with dry $O_2$. Such Group 1 metal/silica gel compositions are described in U.S. Pat. No. 7,410,567 B2 and can react rapidly with water to produce hydrogen gas. A Group 2 metal/silica gel composition, including one or more of the Group 2 metals (beryllium, magnesium, calcium, strontium, barium and radium) may also be suitable.

One or more catalysts can be used to catalyze the hydrogen producing reactions. Examples of suitable catalysts include transition metals from Groups 8 to 12 of the Periodic Table of the Elements, as well as other transition metals including scandium, titanium, vanadium, chromium and manganese. Metal salts, such as chlorides, oxides, nitrates and acetates can also be suitable catalysts.

The rate of hydrogen generation can be controlled in a variety of ways, such as controlling of the rate at which liquid is transported to the reaction area, adjusting the pH, and making temperature adjustments. The rate of hydrogen generation can be controlled to match the need for hydrogen gas. A control system can be used for this purpose, and the control system can be within or at least partially outside the hydrogen generator.

Additives can be used for various purposes. For example, additives can be included with a solid reactant as a binder to hold the solid material in a desired shape or as a lubricant to facilitate the process of forming the desired shape. Other additives can be included with a liquid or solid reactant composition to control pH, to control the rate of reaction for example. Such additives include but are not limited to acids (e.g., hydrochloric, nitric, acetic, sulfuric, citric, carbonic, malic, phosphoric and acetic acids or combinations thereof), or basic compounds. Additives such as alcohols and polyethylene glycol based compounds can be used to prevent freezing of the fluid. Additives such as surfactants or wetting agents can be used to control the liquid surface tension and reaction product viscosity to facilitate the flow of hydrogen gas and/or effluents. Additives such as porous fibers (e.g., polyvinyl alcohol and rayon) can help maintain the porosity of a solid reactant component and facilitate even distribution of the reactant containing fluid and/or the flow of hydrogen and effluents.

In one embodiment, a chemical hydride such as sodium borohydride (SBH) is one reactant, and water is another reactant. The SBH can be a component of a liquid such as water. The SBH and water can react when they come in contact with a catalyst, acid or heat in the reaction chamber. The SBH can be stored as a solid in the reaction area. It can be present as a powder or formed into a desired shape. If an increased rate of reaction between the SBH and the water is desired, a solid acid, such as malic acid, can be mixed with the SBH, or acid can be added to the water. Solid (e.g. powdered) SBH can be formed into a mass, such as a block, tablet or pellet, to reduce the amount of unreacted SBH contained in the effluent that exits the reaction area. As used below, "pellet" refers to a mass of any suitable shape or size into which a solid reactant and other ingredients are formed. The pellet should be shaped so that it will provide a large contact surface area between the solid and liquid reactants. Preferably water is another reactant. For example, a mixture including about 50 to 65 weight percent SBH, about 30 to 40 weight percent malic acid and about 1 to 5 weight percent polyethylene glycol can be pressed into a pellet. Optionally, up to about 3 weight percent surfactant (anti-foaming agent). up to about 3 weight percent silica (anti-caking agent) and/or up to about 3 weight percent powder processing rheology aids can be included. The density of the pellet can be adjusted, depending in part on the desired volume of hydrogen and the maximum rate at which hydrogen is to be produced. A high density is desired to produce a large amount of hydrogen from a given volume. On the other hand, if the pellet is too porous, unreacted SBH can more easily break away and be flushed from the reaction area as part of the effluent. One or more pellets of this solid reactant composition can be used in the hydrogen generator, depending on the desired volume of hydrogen to be produced by the hydrogen generator. The ratio of water to SBH in the hydrogen generator can be varied, based in part on the desired amount of hydrogen and the desired rate of hydrogen production. If the ratio is too low, the SBH utilization can be too low, and if the ratio is too high, the amount of hydrogen produced can be too low because there is insufficient volume available in the hydrogen generator for the amount of SBH that is needed.

A first reactant, such as a solid sodium borohydride (SBH) is mixed in the reaction area with a second reactant, such as a liquid solution of water and malic acid by moving the second reactant from a storage area to the reaction area to react with the first reactant which produces hydrogen gas.

The hydrogen generator can include other components, such as control system components for controlling the rate of hydrogen generation (e.g., pressure and temperature monitoring components, valves, timers, etc.), safety components such as pressure relief vents, thermal management components, electronic components, and so on. Some components used in the operation of the hydrogen generator can be located externally rather than being part of the hydrogen generator itself, making more space available within the hydrogen generator and reducing the cost by allowing the same components to be reused even though the hydrogen generator is replaced.

The hydrogen generator can be disposable or refillable. For a refillable hydrogen generator, reactant filling ports can be included in the housing, or fresh reactants can be loaded by opening the housing and replacing containers of reactants. If an external pump is used to pump fluid reactant composition from the reaction storage area to the reactant area, an external connection that functions as a fluid reactant composition outlet to the pump can also be used to refill the hydrogen generator with fresh fluid reactant composition. Filling ports can also be advantageous when assembling a new hydrogen generator, whether it is disposable or refillable. If the hydrogen generator is disposable, it can be advantageous to dispose of components with life expectancies greater than that of the hydrogen generator externally, such as in the fuel cell system or an electrical appliance, especially when those components are expensive.

Referring to FIG. 1, a fuel cell system 10 is illustrated having a hydrogen generator 20, according to one embodiment. Fuel cell system 10 includes a fuel cell stack 12 and a removable hydrogen generator 20 for generating and supplying hydrogen gas fuel to the fuel cell stack 12. The hydrogen generator 20 also includes a reactant storage container 14 for containing a fluid solution such as water and acid as a reactant for use in the hydrogen generator 20. The storage container 14 is shown as a separate container located outside of the hydrogen generator housing. The fluid solution is pumped via a pump 16 from storage container 14 through hoses 22 and 24 into the hydrogen generator 20 by entering through the liquid reactant inlet port 44. The liquid reactant reacts with a second reactant within the hydrogen generator to generate a hydrogen gas which is then output via hydrogen outlet port 42. The hydrogen gas passes from the outlet port 42 through hose 26 and into the fuel cell stack 12 where it is used as fuel by the anode. Another gas, such as oxygen enters the fuel cell stack 12 through an inlet where it is used as oxidant by the cathode. The fuel cell stack 12 produces electricity that is provided to an electric device through a power output.

Figure 2:
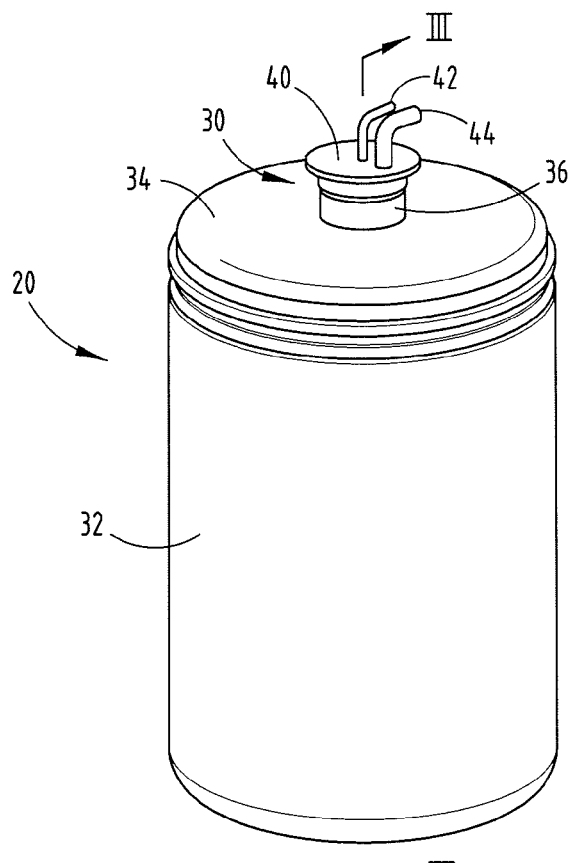
FIG. 2 is a perspective view of the hydrogen generator having the valve assembly shown in FIG. 1.

The hydrogen generator 20 as shown in FIGS. 1 and 2 has a housing 32 generally in the form of a cylindrical container having a closed bottom end and an open top end. However, it should be appreciated that other housing shapes such as prismatic and other sizes may be employed. A lid 34 is provided at the top open end of the housing 32 to close the open end of the housing 32. Lid 34 has an upstanding cylindrical neck with an opening for receiving a concentric valve assembly 30 that controls the liquid reactant entering the inlet port 44 and the hydrogen gas exiting the outlet port 42. The concentric valve assembly 30 is shown aligned at one end with the neck of lid 34 supported by support member 28.

The fuel cell assembly 10 may be located within a housing 18 such as an enclosure within an electronic device that is being powered by the fuel cell stack 12, according to one embodiment. The hydrogen generator 20 may be removed from the housing 18 and disconnected from hydrogen outlet port 42 and fluid reactant inlet port 44 and replaced with a new hydrogen generator, according to one embodiment. Hydrogen generator 20 may be recyclable and reusable such that the reactants stored therein are replaceable and the container 32 and other components are reusable. The liquid reactant solution stored within storage container 14 may be refilled or the container 14 may be replaced with a new container filled with a fresh supply of liquid reactant.

Figure 3:
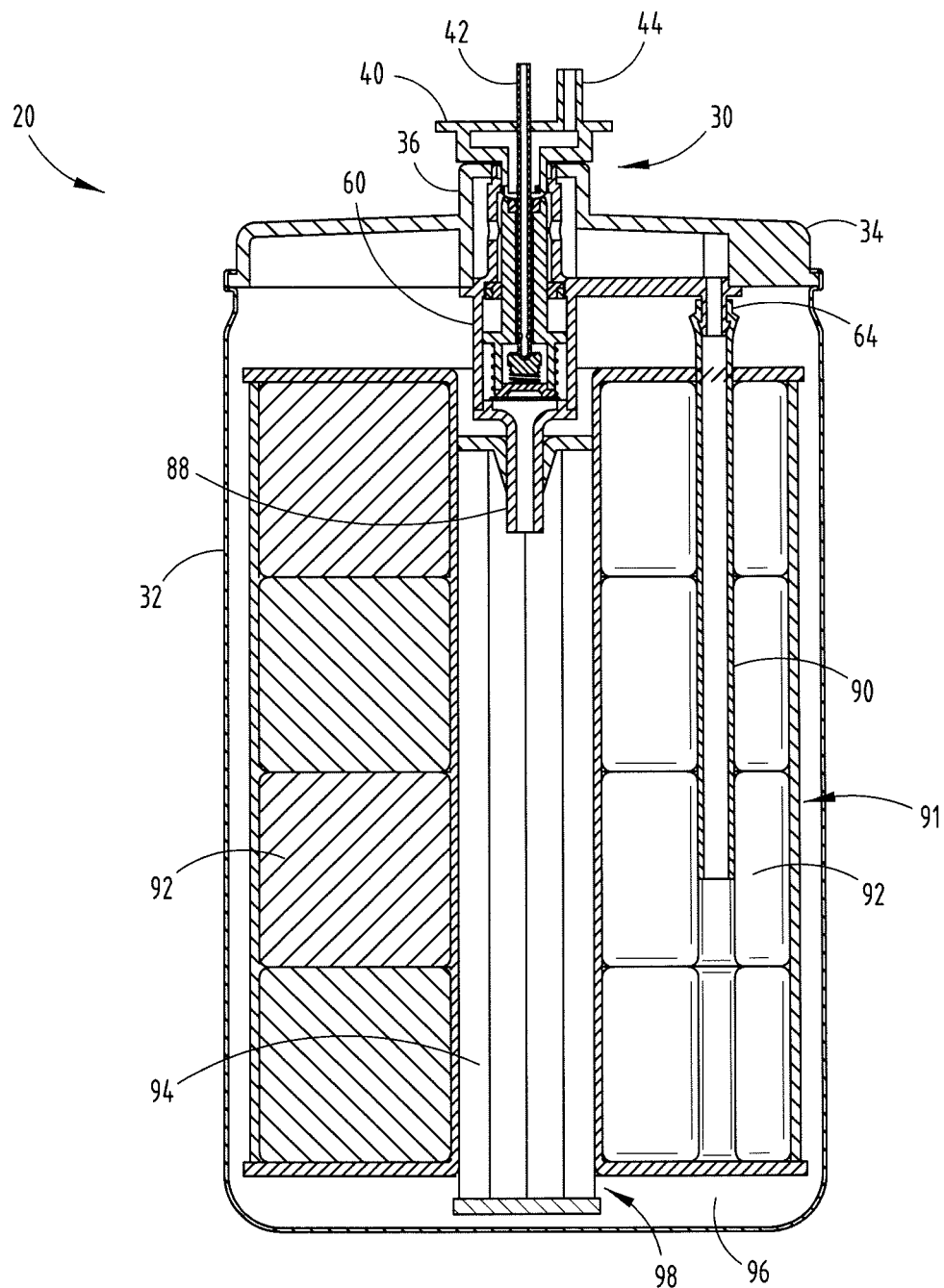
FIG. 3 is a cross-sectional view of the hydrogen generator taken through line of FIG. 2.

The hydrogen generator 20 is shown in FIGS. 2 and 3 having a concentric valve assembly 30 assembled to the lid 34 to control liquid reactant transported into the container 32 and the hydrogen gas output therefrom. Hydrogen generator 20 includes a reaction area for reacting a first liquid reactant with a second reactant to generate hydrogen gas. The hydrogen generator 20 also includes a reactant storage area containing the second reactant composition 92. The second reactant composition 92 as shown in FIG. 3 can be a solid in the form of one or more pellets. A plurality of reactant pellets are shown stacked one on top of another and consuming the reactant storage area. A fluid dispersing member 90 is shown extending into the reaction area and in fluid communication with the fluid inlet coupling 64. The dispersing member 70 delivers the liquid reactant containing the first reactant over a portion of the reaction area to react with the second reactant composition 92 which generates hydrogen gas. The dispersing member 90 may have one or more openings and an overlying wicking material, according to one embodiment.

The hydrogen generator 20 also includes an effluent storage area 98 that includes a filter 94, which can have one or more filter components. As the first reactant composition comes into contact with the second reactant composition, the first and second reactants react to produce hydrogen gas and byproducts. The hydrogen gas flows out of the reaction area and through an effluent passage 96 where it enters the effluent storage area 98. The hydrogen gas carries with it an effluent that includes byproducts, as well as unreacted reactants and other constituents of the reactant compositions. Hydrogen gas and effluent entering the effluent storage area flow through the filter 94. As the hydrogen gas and effluent flow through the filter 94, hydrogen gas is separated from solid particles of the effluent by the filter 94, and exits the hydrogen generator 20 via hydrogen gas outlet 42 of the concentric valve assembly 30.

The concentric valve assembly 30 includes a valve body 60 (housing) and associated components fitted within an opening in the neck 36 of lid 34 as shown in FIGS. 3-6. The valve body 60 defines a second fluid path passing through opening 61, passage 63, fluid inlet coupling 64 and dispersing member 90 for transporting fluid, such as liquid reactant into the hydrogen generator 20, and a first fluid path passing through nozzle 88, passage 83, one or more holes 54, and passage 47 for outputting hydrogen gas generated within the hydrogen generator 20. The valve body 60 is assembled to the lid 34 and sealed thereto to provide sealed first and second fluid paths.

The concentric valve assembly 30 also includes a connector 40 configured to matingly engage and connect to the valve body 60 to open the first and second fluid paths to allow fluids to flow therethrough. The connector 40 has first and second ports 44 and 42 for connecting to a fluid supply and gas consuming device. A user may simply insert the connector 40 as a unitary body into the valve body 60 to open the first and second fluid paths at the same time with a single connector. With the connector 40 removed from the valve body 60, the first and second fluid paths are closed such that fluid flow through the first and second fluid paths is prevented.

The connector 40 may be formed of a unitary material, such as stainless steel. The connector 40 includes a first fluid outlet port 42 also referred to as the hydrogen outlet port and a second fluid inlet port 44 also referred to as the liquid reactant inlet port. Port 42 is configured to be connected to a hose or other fluid passage to allow hydrogen gas generated within the hydrogen generator 20 to be transported outside of the container 32 to a hydrogen consuming device, such as a fuel cell stack. Similarly, inlet port 44 is configured to connect to a hose or other fluid passage to receive a fluid, such as liquid reactant from an outside source, which is transported through the valve assembly 30 via the second fluid path into the hydrogen generator 20.

Connector 40 has a first elongated member 46 of a first width or diameter in the shape of a needle which includes a fluid flow passage 47 and one or more holes 54 for allowing fluid to be transported through the first fluid path in the valve body 60. Also, a second elongated base member 48 having a second width or diameter greater than the first width or diameter is coaxially aligned with the needle 46. Formed at the end of the second elongated base member 48 are one or more holes 52 in fluid communication with a fluid flow passage 45 which allow liquid fluid to pass through passage 45 and the second fluid path of the valve body 60 and into the hydrogen generator 20.

The valve body 60 includes a housing member seated within an opening 68 in lid 34. The housing member serves as a valve fitting for receiving the connector 40. The housing defines a first fluid path through which a first fluid, such as hydrogen gas may pass, and a second fluid path through which a second fluid, such as water and acid may be transported. Valve body 60 is disposed within opening 68 in a sealed relationship provided by an O-ring seal 66. Inner seal 72 is disposed within housing 60 to seal against needle 46 when connector 40 is inserted therein. A rear water seal 74 is disposed between housing 60 and a rear water seal retaining ring 76. A second valve member 78 is spring biased to the closed position via spring 80. A first valve member 82 is coupled to a spring 84 and is spring biased to the closed position to keep the hydrogen gas port closed when connector 40 is not inserted into the valve body. Seal 86 advantageously prevents hydrogen leakage. A nozzle 88 that serves as an outlet fitting is connected at the inlet side of the gas flow path and may include a filter material. Hydrogen gas is able to flow into the nozzle 88 and through the valve assembly 30 when the hydrogen valve member 82 is forced to the open position. The fluid flow path coupling 64 for the second fluid flow path is shown having a dispersing member 90, such as a tube connected thereto to disperse liquid reactant flowing through the second fluid path into the reaction area to react with the second reactant, thereby producing hydrogen gas. Liquid is thereby able to flow through the second fluid path valve assembly when valve member 78 is forced by enlarged member 48 to the open position.

Figure 4:
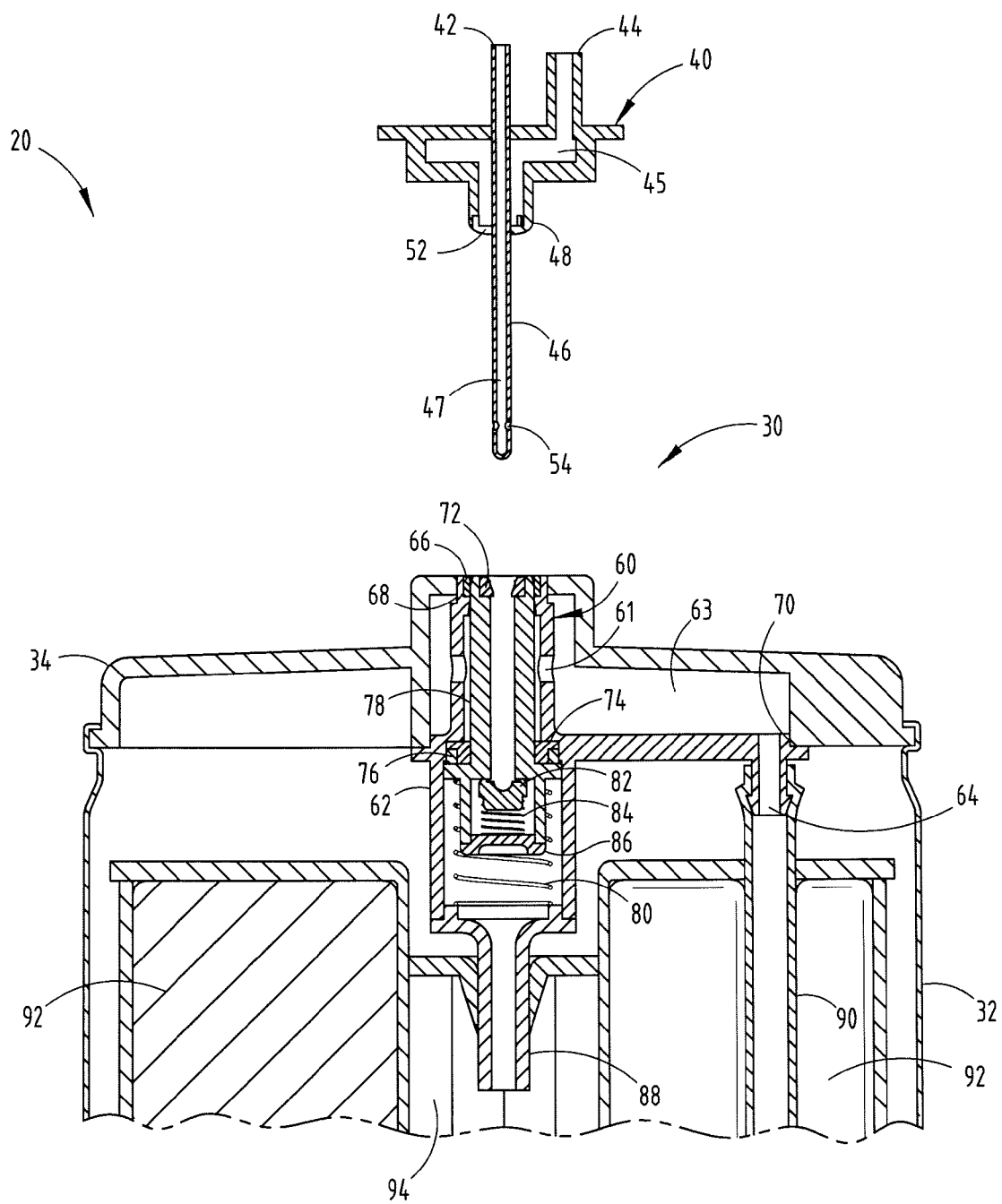
FIG. 4 is an enlarged partial cross-sectional view of the hydrogen generator shown with the valve assembly in the closed position when the connector is removed from the valve body.
Figure 5:
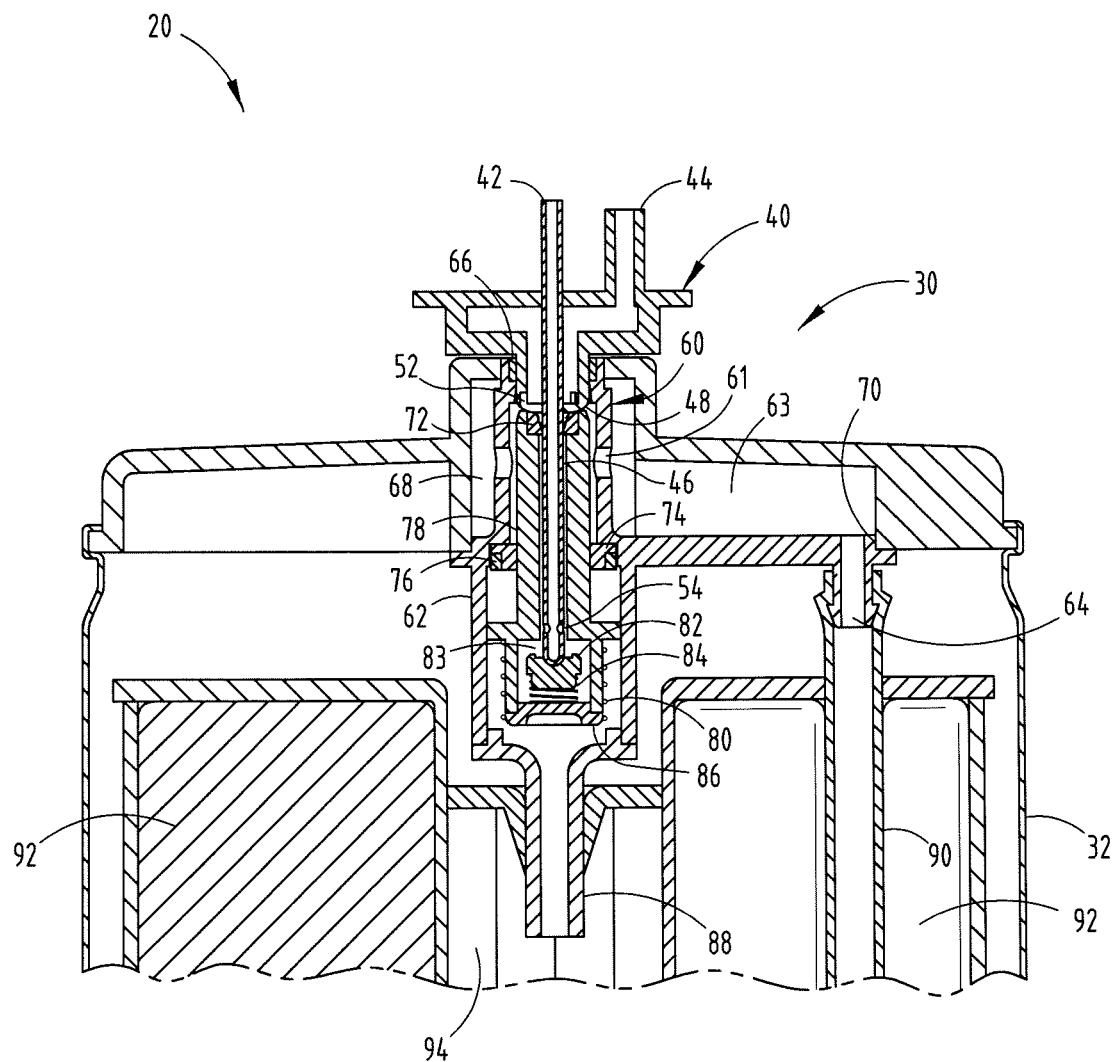
FIG. 5 is an enlarged partial cross-sectional view of the hydrogen generator with the valve assembly shown in the open position with the connector assembled to the valve body.
Figure 6:
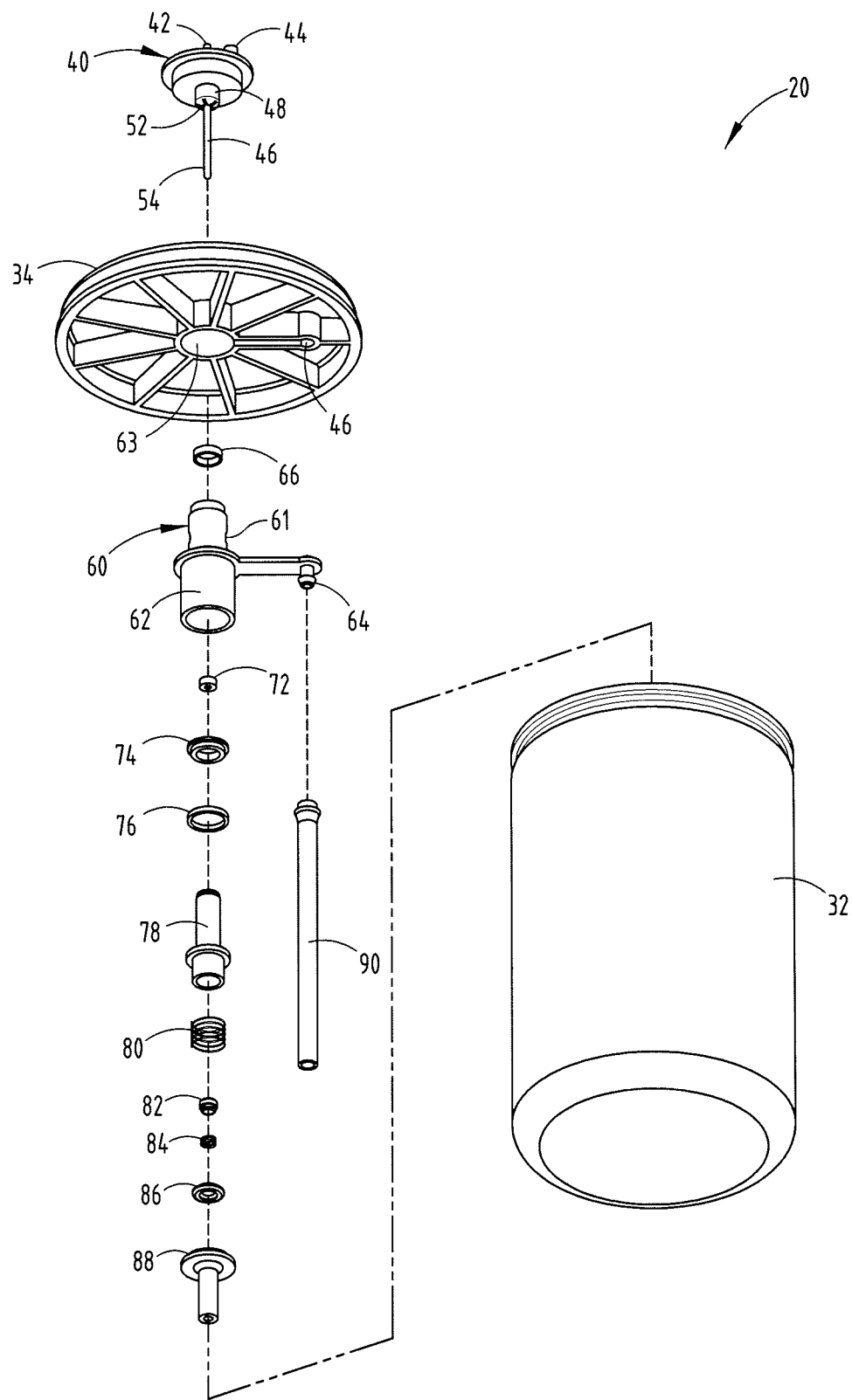
FIG. 6 is an exploded view of the hydrogen generator further illustrating the concentric valve assembly.

As seen in FIG. 4, the connector 40 may be removably connected to the valve body 60 by inserting connector 40 into the valve body 60. This may be achieved by a user aligning the connector 40 with the valve body 60 and inserting the connector 40 as shown in FIG. 5 fully inward, such that the needle 46 pushes on the hydrogen valve member 82 in the direction opposing the hydrogen valve spring 84 to open the first fluid flow path and allow hydrogen gas to flow therethrough. The hydrogen gas passes into hole 54, through passage 47 and exits at port 42. At the same time, enlarged base member 48 of connector 40 engages the water valve member 78 and forces it in a direction opposing spring 80 to open the second fluid flow path to allow water solution to flow therethrough. The water solution passes through opening 61, passage 63, inlet coupling 64 and dispersing member 90 into the reaction area. Accordingly, a fluid, such as liquid reactant may flow through inlet port 44, passage 45, one or more openings 52, opening 61, passage 63, inlet coupling 64 and into the dispersing member 90 where it is dispersed to another reactant in the reaction area to generate hydrogen gas. Hydrogen gas may then flow through one or more filters to nozzle 86 where it passes around the hydrogen valve member 82 in the open position through one or more openings 54 of needle 46 and passage 47 to outlet port 42, where it may be supplied to a hydrogen consuming device such as a fuel cell stack.

The concentric valve assembly 30 advantageously employs a second fluid flow path which surrounds a first fluid flow path and is assembled with a single unitary connector having an inlet and outlet for easy assembly and fewer parts. In the example shown, liquid reactant flows in the second fluid flow path around hydrogen gas which flows in the inner first fluid flow path. As such, the hydrogen gas flowing through the central fluid flow path is surrounded by a liquid and is less susceptible to leakage. The use of an inner valve path within another valve advantageously requires only a single sealed fitting which further minimizes the risk of leakage. The connector 40 may be easily assembled and removed from the valve body 60, as needed, such as to allow for changing or refilling of the hydrogen cartridge.

While the concentric valve assembly 30 is shown and described herein for use with a hydrogen generator, it should be appreciated that the concentric valve assembly 30 may be useful for other applications to allow for the transport of other fluids. According to another embodiment, the concentric valve assembly 30 may be employed for a compressed gas fitting application. According to a further embodiment, the concentric valve assembly 30 may be employed for a hydraulic fitting, such as a tractor hydraulic valve assembly in which the higher pressure hydraulic forward line is surrounded concentrically by the hydraulic return line.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A concentric valve assembly comprising:
a housing defining a first fluid path and a second fluid path;
a first valve member disposed in the first fluid path;
a second valve member disposed in the second fluid path; and
a connector comprising:
a first member having a first fluid passage and configured to engage the first valve member to open the first valve member to allow a first fluid to flow through the first fluid path, and
a second member having a second fluid passage and configured to engage the second valve member to open the second valve member to allow fluid to flow through the second fluid path,
wherein the second fluid path surrounds at least a portion of the first fluid path;
wherein the first and second fluid paths are configured to prevent fluid leakage between the first and second fluid paths.

2. The valve assembly as claimed in claim 1 further comprising a first spring biasing the first valve member toward the closed position and a second spring biasing the second valve member toward the closed position, wherein the first elongated member forces the first valve member to the open position and the second member forces the second valve member to the open position when the connector is assembled to the housing.

3. The valve assembly as claimed in claim 1, wherein the first elongated member comprises a needle having a first width and the second member comprises an enlarged base member having a second width, wherein the second width is larger than the first width.

4. The valve assembly as claimed claim 1 further comprising a first seal disposed between the first and second fluid paths.

5. The valve assembly as claimed in claim 1, wherein the first fluid path is configured to transport a gas and the second fluid path is configured to transport a liquid.

6. The valve assembly as claimed in claim 5, wherein the liquid comprises water and the gas comprises hydrogen.

7. The valve assembly as claimed in claim 1, wherein the valve is configured to interface with a hydrolytic hydrogen generator and to transport a liquid solution of reactant in the second fluid path and to transport hydrogen gas output in the first fluid path.

8. The valve assembly as claimed in claim 7, wherein the housing is assembled to an opening in a container of the hydrogen generator, wherein the connector is removably connected to the housing.

9. The valve assembly as claimed in claim 1, wherein the second fluid path substantially surrounds the first fluid path within a portion of the valve assembly.

10. A hydrolytic hydrogen generator comprising;
a container;
a reaction area within the container;
a first reactant provided in the reaction area;
a liquid solution comprising a second reactant, wherein the first and second reactants react to produce hydrogen gas and byproducts; and
a concentric valve assembly comprising:
a housing defining a first fluid path and a second fluid path;
a first valve member disposed in the first fluid path;
a second valve member disposed in the second fluid path; and
a connector comprising
a first elongated member having a first fluid passage and configured to engage the first valve member to open the first valve member to allow a first fluid to flow through the first fluid path, and
a second member having a second fluid passage and configured to engage the second valve member to open the second valve member to allow fluid to flow through the second fluid path,
wherein the second fluid path surrounds at least a portion of the first fluid path;
wherein the first and second fluid paths are configured to prevent fluid leakage between the first and second fluid paths.

11. The hydrolytic hydrogen generator as claimed in claim 10, wherein the valve assembly further comprising a first spring biasing the first valve member toward the closed position and a second spring biasing the second valve member toward the closed position, wherein the first elongated member forces the first valve member to the open position and the second member forces the second valve member to the open position, when the connector is assembled to the housing.

12. The hydrolytic hydrogen generator as claimed in claim 10, wherein the first elongated member comprises a needle having a first width and the second member comprises an enlarged base member having a second width, wherein the second width is larger than the first width.

13. The hydrolytic hydrogen generator as claimed in claim 10 further comprising a first seal disposed between the first and second fluid paths.

14. The hydrolytic hydrogen generator as claimed in claim 10, wherein the first fluid path is configured to transport a gas and the second fluid path is configured to transport a liquid.

15. The hydrolytic hydrogen generator as claimed in claim 14, wherein the liquid comprises water and the gas comprises hydrogen.

16. The hydrolytic hydrogen generator as claimed in claim 10, wherein the second fluid path substantially surrounds the first fluid path within a portion of the valve assembly.

17. The hydrolytic hydrogen generator as claimed in claim 10, wherein the housing is assembled to an opening in a housing of the hydrogen generator, wherein the connector is removably connected to the housing.

18. The hydrolytic hydrogen generator as claimed in claim 10, wherein the second reactant comprises a solution of water and one or more chemical hydrides, acids, basic compounds, alcohols, polyethylene glycol based compounds, surfactants, or wetting agents.

19. The hydrolytic hydrogen generator as claimed in claim 18, wherein the hydrogen generator comprises a pump for pumping the solution from a storage area through the concentric valve assembly into the reaction area.

* * * * *